Jan. 30, 1962  N. E. PEDERSEN ET AL  3,019,430
DISTANCE-MEASURING APPARATUS AND METHOD
Filed June 4, 1957  5 Sheets-Sheet 5
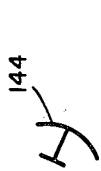
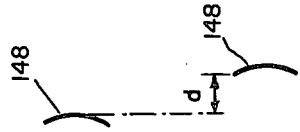
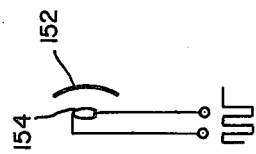
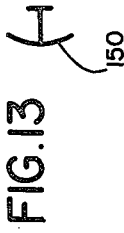

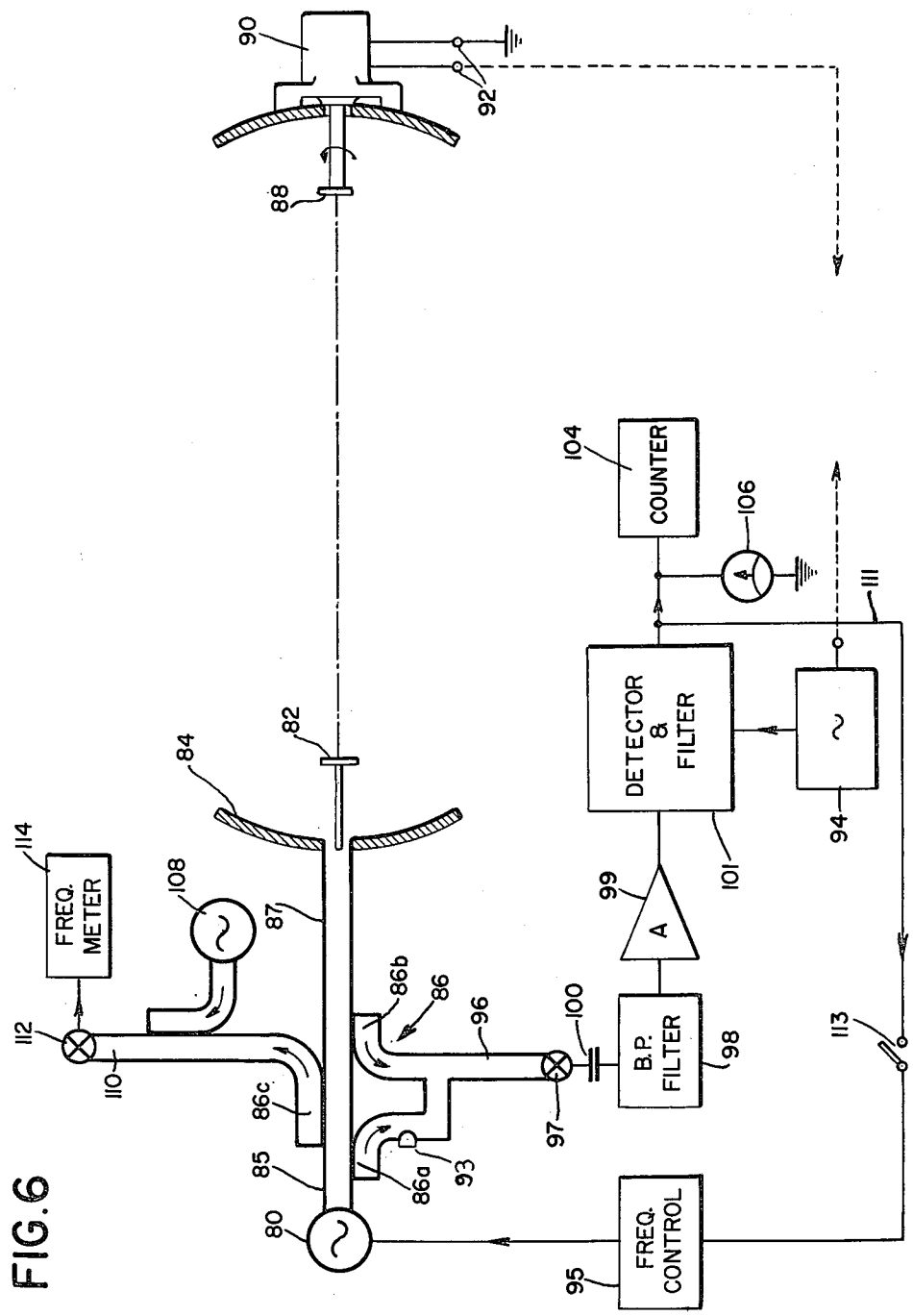

United States Patent Office 3,019,430
Patented Jan. 30, 1962

3,019,430
DISTANCE-MEASURING APPARATUS AND
METHOD
Norman E. Pedersen and Robert Fleischer, Troy, N.Y.,
assignors, by mesne assignments, to Research Corporation, New York, N.Y., a corporation of New York
Filed June 4, 1957, Ser. No. 663,502
24 Claims. (Cl. 343—12)

This invention relates to apparatus and methods for measuring distance or variations in distance.

The invention is particularly applicable to measuring the distance from a first station to a reflector at a second station, with the aid of electromagnetic or ultrasonic waves.

Among the difficulties of distance-measuring systems known heretofore, using reflected waves, are those of distinguishing the desired reflections from undesired reflections. Also, previous systems have not given the high degree of accuracy required for certain applications.

An object of the invention is to measure distance, or variations in distance, from a first station to a second station with the aid of reflected waves, with a high degree of accuracy, despite the presence of undesired reflections.

In one embodiment of the invention, an electromagnetic wave is transmitted from a first station to a reflector located at or very near an object at a second station, and the waves reflected by the reflector are sensed at the first station. The reflector is rotated or otherwise varied so as to vary its reflecting properties periodically at a rate low compared with the frequency of the transmitted wave, and these variations in the reflector in turn vary the reflected wave. The thus-varying reflected wave is received at the first station and mixed with a much larger quantity of the transmitted wave to produce a composite wave. This composite wave is selectively detected, with the aid of frequency-selective means, for example, a band-pass filter, in such a way as to derive a quantity representing the variations in the amplitude of the composite wave produced by the periodic variations in the reflecting properties of the reflector. If, at the first station, the reflected wave leads or lags the transmitted wave at the detector by 90 degrees in phase, and if, as assumed, the reflected wave is small in amplitude compared with the larger amplitude of the transmitted wave mixed with it, the quantity mentioned above, derived by selectively detecting the variations in amplitude of the composite wave, will approach a minimum or null.

In one mode of operation, the spacing of the reflector with respect to the object at the second station is initially adjusted, toward or away from the first station, to a definite value so as to produce such a minimum or null. Thereafter the reflector is maintained at that fixed spacing from the object so that any change in the position of the object is transmitted to the reflector. In certain uses of the invention, it may be desired to determine, from time to time, whether the object at the second station has shifted toward or away from the first station. The system of the present invention is extremely useful for this purpose. Having initially established as a reference condition a particular output quantity from the detector and filter, for example, a minimum or null, the operator from time to time ascertains whether the same output is being maintained. If the output is no longer the same, this accurately indicates even small shifts in the position of the object at the second station with respect to the first station.

In one form of the invention, the output quantity referred to is a wave, the frequency of the predominant component of which is the frequency at which the reflecting properties of the reflector are varied. This wave may be applied to apparatus responsive to its sense or phase, for the purpose of determining the sense or direction of any shift in position of the object at the second station.

Moreover, instead of identifying shifts of the object, at the second station by observing deviations of the output quantity from a reference value, such as a null, such deviations may be employed in a servo system to change the frequency of the transmitter to a new value which will restore the reference-value condition, and at the same time to produce a quantitative indication of the amount and direction of the shift of the object.

In another particularly good embodiment, instead of establishing a desired initial reference condition by adjusting the spacing of the reflector with respect to the object at the second station, the reference condition may be established by adjustment of the frequency of the transmitter.

All the above measurements may, with the present invention, be made not only with a high degree of accuracy, but also under highly adverse conditions, specifically, under conditions in which undesired or spurious reflections are obtained from various objects other than the reflector, such as the terrain, buildings or vehicles.

The invention is applicable not only to identifying variations in the distance between a first station and an object at a second station, but also to measuring the absolute distance. In such a use of the invention, the frequency of the transmitted wave is gradually varied, in addition to the periodic variations of the reflecting properties of the reflector. When the frequency is varied, there is produced a variation in the composite wave, as the frequency variations cause the transmitted and reflected waves to pass through a series of conditions at which they differ in phase by 90 degrees at the first station. The composite wave is selectively detected and filtered at the first station so as to derive a wave having a frequency, or frequency components, related to the repetition rate of variation of the reflector, and having an amplitude which approaches a minimum when the phase relationship of the transmitted and received waves approach a 90-degree relationship at the detector. As the frequency of the transmitter is gradually varied through a measured range, the derived wave will thus pass through a series of minima, and these minima are counted, as by a counter. The periodic variation in the reflecting characteristics of the reflector is at a repetition rate more rapid than the repetition rate at which these minima are produced by the variation of the transmitted frequency. The transmitted frequency is varied through a relatively large range, to produce a large number of these minima. from the measured increment of frequency and the measured number of minima produced by that increment of frequency, the distance is determined. In this embodiment, the variation in the reflecting properties of the reflector is important in producing accurate results even under conditions in which many spurious reflections are obtained. The selective detection of the composite wave is based upon the known repetition rate of variation of the reflector, and the effect of this variation on the compositive wave. The minima or nulls counted represent the interaction of the transmitted wave with the wave reflected from only the reflector which is varied at the known rate. The result is consequently not confused by interaction of the transmitted wave with spurious waves reflected from other objects.

As the description proceeds, it will be made clear that the minima or nulls obtained by the present invention are not just points of minimum amplitude in a standing wave pattern; they are points where the variation in amplitude of the composite wave, caused by the variation in the reflecting properties of the reflector, is a minimum. This generally occurs in the proposed system when the relationship of the transmitted and reflected waves has approached 90 degrees.

Although in certain embodiments of the invention having special advantages, the transmitted wave may be continuous, that is, of the C.W. type, in other embodiments, pulsed (discontinuous) waves, or waves otherwise modulated, may be used to advantage. It will be understood throughout the description that the expression "wave" is intended to be applicable to either continuous or pulsed waves except where the description specifically refers to one or the other.

Further features and advantages of the invention will be understood from the subsequent detailed description of an illustrative embodiment of it, taken in connection with the attached drawings in which:

FIG. 6 is a schematic view of a system representing another embodiment of the invention, particularly useful in measuring the absolute distance from a first station to a second station; and FIGS. 7 through 13 are schematic views illustrating various methods and apparatus for varying the reflecting properties of a reflector, which may be used with the systems described herein.

Figure 1:
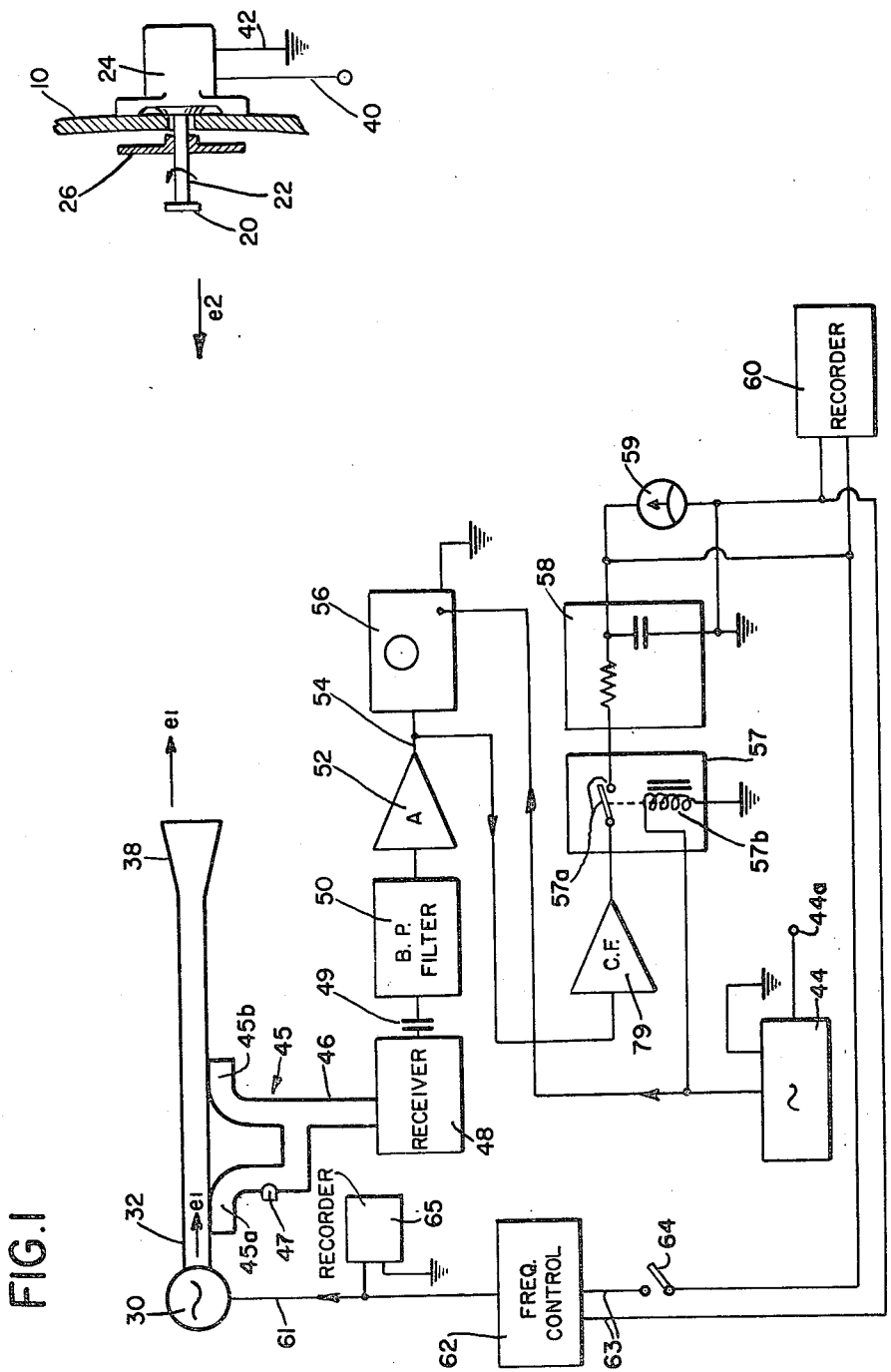
FIG. 1 is a schematic view of a system in which the invention may be used.

In FIG. 1, there is shown a member 10, which may, for example, be a part of a large object. In many applications it is extremely useful to be able to check the position of the member 10 from time to time, to determine whether it has remained at the same position in relation to a reference point or points. For example, consider the apparatus shown in FIG. 2. There is shown here a portion of a large parabolic reflector (dish) 12 intended for use in transmitting and/or receiving radio waves over extremely long distances, for example, as in radio astronomy. Such a dish might be used in tracking satellites or other objects moving through space beyond the earth's atmosphere, or an radar, or in scatter propagation. The shape of such a dish should be correct within extremely close tolerances. It may be assumed, in this illustration, that the shape of the dish 12 has been checked very carefully by many tedious mechanical measurements and has been found to be correct. However, assume that it is desired from time to time to check the shape to make certain no changes have occurred greater than a tolerable amount. Such changes may be brought about by a large number of possible causes; for example, changes in temperature, the application of stress to the members of the apparatus, fatigue of materials, and the history of the apparatus so far as changes in its position, orientation, etc., are concerned.

In using the system of the present invention in such an application, there may be provided at a first station, located on the axis of the parabolic dish, preferably close to its focus point, apparatus for illuminating simultaneously all parts of the entire inner surface of the dish with electromagnetic waves. The location of this first station may be considered a reference point.

As to an individual point of the dish 12, for example, the point including the portion or member 10, what is to be determined is whether that point remains the same distance from the first station, when it is checked from time to time. Similar measurements are made to determine whether other individual points, for example, 14 and 16, change in position, as measured by their distance from the first station. The method thus involves determining whether, as between a first measurement and a second measurement made later, there is a change in the distance of selected points of the dish from the first station. Many points on the dish, for example, several hundred, such as 10, 14, and 16, are checked in this manner.

FIG. 1 shows an arrangement for making such a check of the point including the member 10. There is provided a small reflector mounted in a known spaced relationship to the member 10. In one form, the reflector may comprise a small dipole 20 and a disc 26, both carried by a rotatable shaft 22 extending through the member 10. Supported on the back side of the member 10 is a motor 24 which, when energized, rotates the shaft 22 and thereby rotates the dipole 20 and the disc 26. The disc 26 is located at a fixed spacing, a quarter wavelength, behind the dipole 20. The assembly of the dipole 20 and the disc 26, however, are adjustable in spacing toward or away from the dish, represented in FIG. 1 by its member or portion 10.

At the first station there is provided a source 30 of high-frequency electromagnetic oscillations. This source may, for example, in some forms comprise a klystron. In other forms it may include sources of other types. Electromagnetic waves from the source 30 are propagated through a wave guide 32 to a horn, dipole, or other form of antenna or similar radiating device 38. The device 38, illustrated in this figure as a horn, propagates the electromagnetic waves toward the member 10 and the reflector 20. It may be assumed that the nature of the device 38 and the remainder of the apparatus at the first station is such that the transmitted wave is polarized in a given direction, and the receiving apparatus at the first station is preferentially sensitive to receive waves polarized in the same general direction as those of the transmitted waves.

I none illustrative form, the transmitted wave may be of the C.W. type, having a wave length of 3 centimeters. The wave length may, with advantage, be chosen so that it is at least as great a 4 times the maximum variation in distance which it is desired to detect.

In one form of the apparatus, the wavelength may be fixed. In other forms, it is varied, as will be explained.

The motor 24 is energized through leads 40 and 42. The speed of rotation of the motor may be such as to rotate the dipole 20 at, for example, 200 revolutions per second. The voltage source to which the leads 40 and 42 are connected may, for example, be a 200 cycle-per-second alternating supply. Although there are unique advantages in employing an alternating voltage supply for driving the motor 24, and in supplying the apparatus at the first station, including an oscilloscope there, with a voltage synchronized with the supply which drives the motor 24, other arrangements are also possible. The motor 24 may be driven at a constant rate in some other manner; for example, it may be energized by a D.-C. supply or a 60-cycle supply.

The first station includes an alternating voltage source 44. This source may, in some embodiments, advantageously be synchronized with the source connected to the leads 40 and 42. The synchronization may be by a wire connection or a radio link. However, satisfactory operation may be obtained without such a connection or link by operating the motor 24 at a constant predetermined speed, and by operating the source 44 at a rate carefully controlled in frequency and phase so as to produce, in effect, synchronization of the indicating apparatus at the first station with the rotary motion of the dipole.

As the dipole 20 rotates, in certain positions it will be oriented, with respect to the polarized wave which strikes it, so as to reflect a maximum amount of electro-magnetic power, and when it has rotated 90 degrees farther, it will be oriented so as to reflect a minimum amount of power. One full cycle of rotation of the dipole therefore causes the power reflected from the dipole to pass through two maxima and two minima. Hence the reflected power is varied at a repetition rate twice the rotation frequency of the dipole.

The wave generated by the source 30, which is to be transmitted, may be identified by the symbol $e_1$ and the reflected wave from the dipole 20 and its disc 26 by the symbol $e_2$. At the first station, the reflected wave $e_2$ is received by the device 38, passes to the left through the waveguide and into the directional coupling device 45. The coupling device 45 is arranged so as to transmit through an output waveguide 46 the reflected wave $e_2$ (via directional coupler 45b) and a much larger amount of the transmitted wave $e_1$ (via directional coupler 45a).

In the path beyond the directional coupler 45a there is provided a variable attenuator 47 for controlling the amount of the wave $e_1$ which reaches the waveguide 46.

The wave emerging through the waveguide 46, including both the transmitted and the received waves $e_1$ and $e_2$ may be referred to as a composite wave.

Reference is now made to FIGS. 3 through 5. The transmitted wave $e_1$ and the reflected wave $e_2$, as they emerge through the waveguide 46, will have a phase relationship which depends upon the length of the path from the first station to the reflector 20 and back to the first station, and also depends upon the frequency of the transmitted wave.

It may be assumed here that $e_1$ is a high-frequency wave of constant amplitude and that $e_2$ is a wave of the same high frequency but modulated in amplitude at a low frequency, which is twice the dipole rotation rate in the present embodiment.

Figure 3A:

As shown in FIG. 3a, if the wave $e_1$ and the wave $e_2$ are in phase, the result is that the composite wave will have a maximum value $e_3$ when $e_2$ has its maximum value. In FIG. 3a $e_3$ is equal to the sum of the magnitudes of $e_1$ and $e_2$. Bearing in mind that the rotation of the dipole causes $e_2$ to vary with time in magnitude from its maximum value shown at the top of FIG. 3a to a much smaller value, it may be seen that the composite wave will vary from a maximum value $e_3$ to a minimum value approximately equal to $e_1$.

Entering the horn 38, in addition to the wave reflected by the rotating dipole 20, which is amplitude-modulated at a known frequency, there are other undesired reflected waves which in general are not amplitude-modulated, or which if amplitude-modulated are not modulated at that frequency.

Figure 4A:
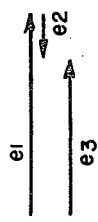

Consider now the effect if $e_1$ and $e_2$ are 180 degrees out of phase, as shown in FIG. 4a. The vector sum $e_3$ of $e_1$ and $e_2$ will now be equal to the difference between the magnitudes of $e_1$ and $e_2$. As $e_2$ varies in magnitude, $e_3$ will vary from a small value equal to the difference between $e_1$ and the maximum value of $e_2$, to a larger value approximately equal to $e_1$ when $e_2$ approaches zero.

Figure 5B:
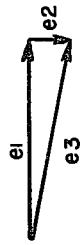
FIGS. 3–5 are sketches to be used in explaining the effects of the phase relationship of transmitted and reflected waves.
Figure 5A:
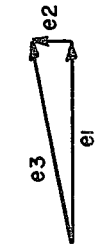

Consider now the situation when $e_1$ and $e_2$ are 90 degrees out of phase because of the distance of the dipole 20 from the first station. It should here be recalled that the coupling device 45 supplies to the waveguide 46 a composite wave including a much larger quantity of $e_1$ than $e_2$. From a study of FIG. 5a, it may be seen that as $e_2$ varies in magnitude between its maximum value and its approximately zero value, the magnitude of the composite wave $e_3$ will remain approximately constant and equal to the wave $e_1$. The only effect of variations of magnitude of $e_2$ is to cause a very small change in the phase of the composite wave $e_3$. FIG. 5a illustrates the case in which $e_2$ leads $e_1$ by 90 degrees. It will also be true, in case $e_2$ lags $e_1$ by 90 degrees, as shown in FIG. 5b, that $e_3$ remains approximately constant in magnitude as $e_2$ varies in magnitude, provided $e_2$ is much smaller than $e_1$.

Apparatus at the first station will now be described for detecting whether or not the amplitude of the composite wave is in fact remaining substantially constant (in accordance with FIG. 5a or 5b), as the dipole 20 at the second station is rotated.

The composite wave from the waveguide 46 is applied to a microwave receiver 48. In one simple form, the receiver 48 may comprise a crystal detector. The receiver 48 is adapted to derive from the amplitude-modulated, high-frequency wave a wave representative of the amplitude modulations but substantially free from the high-frequency variations. This wave may include in addition to the desired variations, noise variations, including those produced by the crystal detector, and undesired frequency components caused by moving objects other than the desired one. The system includes A.-C. coupling after the detector, this being schematically shown by a coupling condenser 49. Because D.-C. components cannot pass through the coupling condenser, the voltage immediately to the right of this condenser is free from any D.-C. component in the output of the detector. This has the effect of eliminating the effect of the unmodulated components of $e_3$, thus eliminating the effect of reflections from stationary objects. The output from the receiver (detector) 48 is passed through a band-pass filter 50 and then through an amplifier 52. The band-pass filter eliminates frequency components other than the desired ones; among the eliminated components are noise components and components produced by the effects of moving objects other than the reflector 20. There is consequently produced in the output of the filter 50, and in the lead 54 a voltage, substantially free from the radio wave carrier frequency of the source 30, but which, by its magnitude and sense, represents variations in the amplitude of the composite wave. More specifically, the voltage in the lead 54 will be zero, or a minimum, when the transmitted wave and the received wave reflected by the dipole have, at the first station, approximately a 90 degree relationship. The voltage in the lead 54 will, if this relationship mentioned above is other than 90 degrees, be an alternating voltage comprising a predominant frequency component related to the frequency at which the reflecting properties of the reflector 20 is varied. The amplitude of this voltage will be related to the extent to which this phase relation differs from 90 degrees. In the illustrative arrangement, using a rotating dipole, this predominant frequency component will be a sinusoidal voltage having a frequency equal to twice the rotation frequency of the dipole. Thus in one good embodiment, the dipole rotates through 360 degrees "$f$" times per second; this varies its reflecting properties systematically at a frequency $2f$; and the band-pass filter may be tuned to pass frequency components in the neighborhood of $2f$.

In other embodiments the band-pass filter 50 may usefully be tuned to a harmonic of the frequency at which the reflecting properties of the reflector 20 are varied. In certain embodiments this variation of reflecting properties may be non-sinusoidal in nature, for example, it may be in the nature of a square wave or a sawtooth wave. Such variations produce, in the output from the receiver 48, waves high in harmonic content, and with such arrangements the filter may be tuned to select either the fundamental or a given harmonic of the waves from this detector.

The frequency-selective device 50 may take a variety of forms. For example, it may be an inductance-capacitance band-pass filter, or an overcoupled transformer, or a series of R-C filters (high-pass and low-pass, respectively) isolated by buffer stages, or a feedback amplifier with a frequency-selective feedback loop.

The phase or sense of the voltage in the lead 54 will also be determined by the phase relation of the transmitted wave $e_1$ and the received wave $e_2$ reflected from the dipole. A change in the distance between stations, sufficient to change the phase of $e_2$ with respect to $e_1$ from a leading angle of say 80 degrees to a leading angle of say 105 degrees, produces a 180-degree shift in the phase of the voltage in the lead 54. These and related effects may be employed, in case it is found that the second station has shifted with respect to the first station, to determine the direction of the shift.

The voltage output from the amplifier 52 is applied to the vertical-deflection plates of an oscilloscope 56. The horizontal-deflection plates are supplied with a sawtooth wave controlled by the source 44, having a synchronized relation to the rotation of the dipole 20. Thus the sawtooth voltage applied to the horizontal-deflection plates is at a repetition rate related to the frequency of the voltage on the vertical plates to produce a standing wave pattern.

In the event a wire connection or radio link is employed to synchronize the voltage source for the motor 24 with the source 44, this connection or link may couple the lead 40 to a synchronizing terminal 44a of the source 44.

The frequency of the component selected by the filter 50 is thus preferably a controlling factor in determining the frequency of the wave applied to the horizontal plates of the oscilloscope 56. In one good arrangement, the frequency of the wave selected by the filter 50 is equal to, or an integral multiple of, the frequency of the wave applied to the horizontal plates of the oscilloscope.

Thus, for example, the dipole may rotate at an audio-frequency of, say 200 cycles per second, and the frequency of the wave in the lead 54 and of the sawtooth wave may be 400 cycles per second.

Figure 5C:
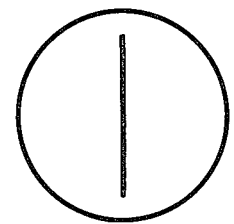
Figure 4B:
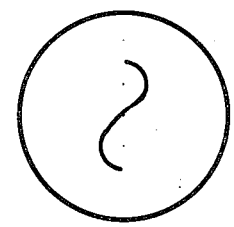
Figure 3B:
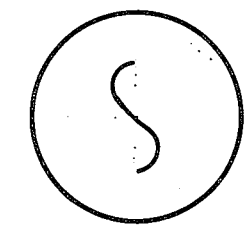

FIGS. 3b, 4b, and 5c show the appearance of the face of the cathode ray tube for various conditions. FIG. 5c represents the appearance when $e_1$ and $e_2$ have a 90 degree phase relation, as in FIG. 5a or 5b. It may be assumed that the initial condition is that of FIG. 5c, produced, for example, by the condition of FIG. 5a. FIGS. 3b and 4b show the appearance of the oscilloscope when the phase relation is not 90 degrees, indicating a shift, toward or away from the first station, of the member 10 and the dipole 20. If FIG. 3b indicates a small shift of member 10 toward the first station, FIG. 4b indicates a small shift away from the first station.

As stated previously, the dipole 20 and its shaft 22 are arranged to permit adjustment of the position of the dipole 20 and its disc 26 with respect to the position of the member 10 in such a way that the dipole 20 and disc 26 are moved slightly toward or away from the first station. In one mode of operation, this adjustment is initially made so as to establish a null in the voltage in the lead 54, as indicated in FIG. 5c. Thereafter the dipole 20 retains this same known spacing from the member 10. After this initial adjustment, the apparatus is operated, and so long as there is no shift in the position of the member 10, the indication should be as shown in FIG. 5c. At a later time, for example, hours, days, or weeks later, the apparatus would again be checked, to determine whether the member 10 had shifted in position with respect to the reference point at the first station. If the appearance were the same as shown in FIG. 5c, the conclusion would be that it had not so shifted. This conclusion would be valid provided it is known that any such shift is not great enough to produce another (different) null condition.

If, when the second check is made, the appearance of the oscillocope screen is not as shown in FIG. 5c, but is as shown in FIG. 3b or FIG. 4b, the conclusion is that the member 10 has shifted. Steps may then be taken to restore the member 10 to the original desired position.

From FIGS. 5a, 5b and 5c and from the above description, it may be seen that a null condition, as shown in FIG. 5c, may correspond to either the condition shown in FIG. 5a or the one shown in FIG. 5b. At the beginning of a test it is desirable that the operator adjust the position of the dipole 20 and its disc 26 so as to produce a particular null condition, that is, either the one of FIG. 5a or the one of FIG. 5b. One of these may be distinguished from the other by making a slight temporary sihft in the position of the dipole. Thus a slight decrease in the distance of the dipole from the transmitting station will shift the condition of FIG. 5a toward the condition of FIGS. 3a–3b. On the contrary, a slight increase in this distance will shift the condition of FIG. 5a toward the condition of FIGS. 4a–4b. It will thus be seen that from knowledge of the initial condition and of the effect of a change in a given direction, one may, by observing the oscilloscope, determine the direction (sense) of any changes in the distance.

There will now be described apparatus which may be used in addition to, or instead of, the oscilloscope 56, for deriving an indication of the change in the distance between the two stations. There is provided a phase-sensitive detector 57, and an associated averaging filter 58. The output from the filter 58 is applied to indicating and recording voltmeters 59 and 60 respectively. The recording voltmeter records voltage as a function of time. The detector is illustrated in the form of a chopper or polarized relay having a pair of contacts 57a and a winding 57b for opening and closing these contacts. The output quantity appearing in the lead 54 is applied through a cathode follower 79 to one of the contacts 57a. The other contact is connected to the filter 58. The winding 57b is energized by alternating current from the source 44. If, for example, the frequency of the wave in the lead 54 is 400 cycles per second, the winding 57b may be energized with a 400 c.p.s. wave so that it alternately opens the contacts 57a for one-half the cycle (substantially $\frac{1}{800}$ of a second) and then closes the contacts for a similar period of time, repetitively. The output from the averaging filter 58 will be zero when there is a certain predetermined phase relation between the wave in the lead 54 and the timing of the motion of the contacts 57a. With proper adjustment of the apparatus, this condition corresponds to a condition in which the wave from the source 44 and the wave from the lead 54 have a 90-degree phase relationship.

Thus the existence of zero output from the filter 58, as indicated on the voltmeter 59 and the recording voltmeter 60, defines a reference condition. This reference condition corresponds to a predetermined phase relation between the transmitted wave $e_1$ and the reflected wave $e_2$, because the phase relation between these two waves determines the phase of the modulation envelope of the composite wave $e_3$, which in turn determines the phase of the wave in the lead 54. In case the voltage in the lead 54 does not go to zero when it has its minimum condition, the apparatus may be adjusted so that the indications of the instruments 59 and 60 are zero under this condition. This is very useful in obtaining accurate indications of the reference condition, and of deviations therefrom.

The indicating and recording instruments 59 and 60 are of the type in which zero is indicated in the center of the scale, and the polarity of the output is indicated by the direction of the deviation of the indicating or recording element. This provides an indication of whether the dipole 20 at the second station has moved toward or away from the first station.

In case it is desired to monitor continuously any deviation in the distance between the first and second stations, this may be accomplished by the recorder 60.

The instruments 59 and 60 may be calibrated to read the amount of the deviation in distance. They are useful, however, even if they indicate the presence of and direction of a deviation and not the amount.

Automatic wavelength control

Apparatus will now be described which may, in some cases, be employed to advantage to aid in initial adjustment of the apparatus to a null condition, and also may be employed to provide indications of shifts in the position of the dipole 20. The frequency of the source 30 is controlled, through a connection 61, by a frequency-control 62 having input leads 63. Thus if the source 30 is of the klystron type, the device 62 may include the klystron voltage supply. The voltage supplied to the leads 63 may control the repeller voltage so as to control the frequency of the klystron 30. The output from the filter 58 is applied through a switch 64 to the leads 63. A recording voltmeter 65 is operated by the device 62 through the lead 61.

In some embodiments, in addition to controlling the frequency of the source 30 by an applied voltage, there may be employed a mechanical motion, as for changing the cavity dimensions, and the recorder 65 may be arranged to respond to the net effect on the tuning of the source 30.

This "automatic wavelength control" portion of the apparatus may be employed to produce a servo-type action which, in one embodiment, works in the following manner. As an initial step in operation of the apparatus, the switch 64 is closed. Any deviation from zero of the output from the filter 58 actuates the device 62 to adjust the frequency of the source 30 so as to establish a zero output from the filter 58. This thus establishes an initial reference or null condition. The indication of the recorder 65 will now indicate this initial condition. The switch 64 may be left closed, and if there is any change in the distance of the dipole 20 from the first station, this would tend to produce other than a null output from the filter 58, but the previously described servo-type action would change the voltage in the lead 61 so as to change the frequency of the oscillator 30 so as to reestablish the null condition. This change in the voltage in the lead 61 is continuously indicated on the recorder 65. This recorder may be calibrated to indicate continuously changes in the distance of the dipole 20 from the first station. Thus with this mode of operation, with the switch 64 closed, the recorder 65 will produce an indication in which there is no ambiguity, even if the shift in the position of the dipole is greater than that value which would, with the switch open, shift the indication from one null to another. The automatic wavelength control portion is particularly useful for continuous monitoring of a particular reflector.

There has thus been described apparatus for determining variations in the distance of a second station from a first or reference station.

By repeating the operations, using another reflector at another location, similar checks may be made of deviations in the distance from the first station to a third station or a fourth station, etc.

Figure 2:
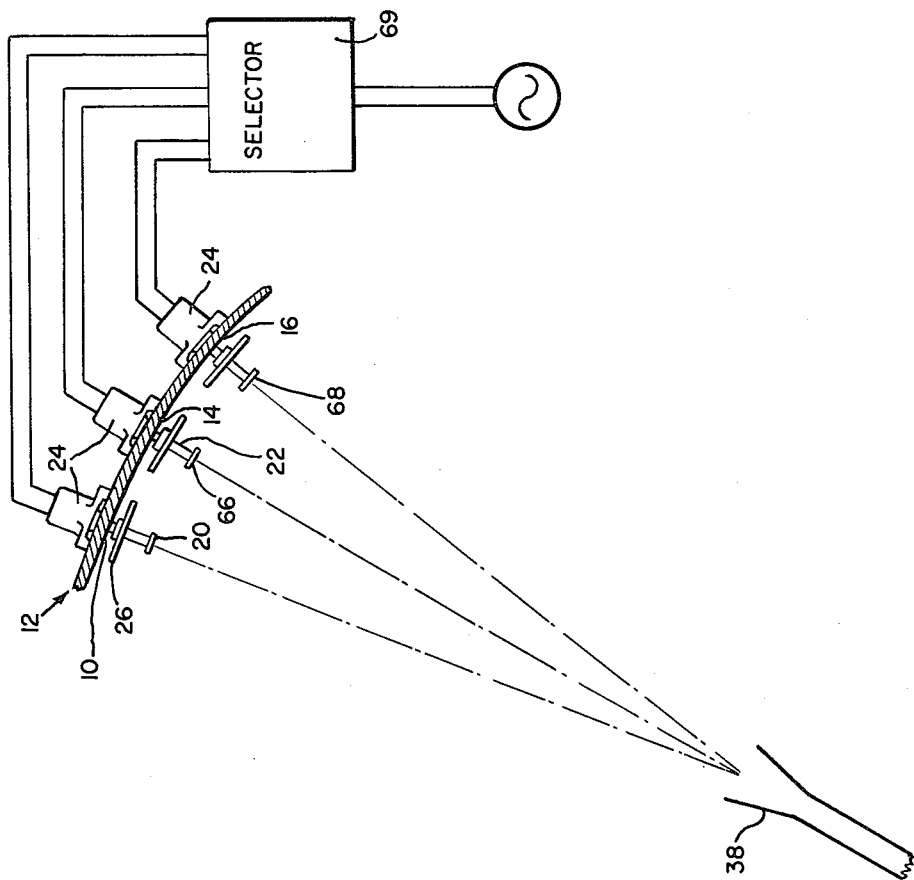
FIG. 2 is a schematic view showing how the apparatus of FIG. 1 may be used to sense changes in the shape of a large object, illustrated as a large reflector of radio waves.

To determine variations in the shape of an object such as the dish 12, a large number of dipoles similar to 20, such as 66 and 68, are located at spaced points of the dish, such as 14 and 16, as shown in FIG. 2. There may, for example, be 200 such dipoles at spaced points of the dish, all illuminated simultaneously by the horn 38. Each of the dipoles is provided with its small energizing motor, for rotating it at the predetermined speed to which the apparatus is responsive, and the various motors are adapted to be selectively energized, one at a time, by a selector switch 69. The sensing apparatus for the reasons explained above, is responsive only to the one rotating dipole. When the initial check is made for each dipole, its spacing is adjusted, with respect to its frame member, to produce a particular null or a minimum on the oscilloscope screen and/or on the other indicators which have been described. It is preferable that all dipoles be adjusted to the particular null condition of FIG. 5a or all to that of FIG. 5b. When a subsequent check is made, any dipole which does not then produce the same condition as initially on the indicator has shifted in position. This is an indication that the shape of the dish has changed from the initial shape.

The system of the present application is capable of detecting, with a high degree of accuracy, despite the presence of spurious reflections, variations in distance of very small magnitude. Thus variations in distance of the order of a small fraction of a millimeter have been detected.

In sensing the distance, or variations in the distance, of an object, spurious reflections typically come from a number of other objects, including the terrain, at varying distances from the transmitter. One important characteristic of reflections from these other objects is that they are not modulated at the frequency at which, in the system of the present application, the reflecting properties of the reflector at the second station are varied, as by the rotation of the dipole 20.

These spurious reflections may have an effect on the composite wave in the waveguide 46, and may affect the receiver 48, but the A.-C. coupling indicated by the condenser 49 and the band-pass filter 50 reject the effects of these reflections.

*System for measuring absolute distance*

In FIG. 6 there is shown a system which may be used to measure the absolute distance of an object at a second station from a first or transmitting station.

There is shown a variable-frequency transmitting oscillator 80, a dipole radiator 82 and an associated parabolic reflector 84. The radiator 82 and its reflector are used both for transmission and reception. The oscillator 80 may be of the klystron type, the backward-wave oscillator type, or another type. Power from the oscillator 80 is conducted through a waveguide 85, a directional coupling device 86 and a waveguide 87 to the dipole 82.

At a second station there is located a reflector, illustrated in the form of a rotatable dipole 88 rotated by a motor 90, which motor is energized from an alternating voltage source through terminals 92. The rotation of the dipole 88 is at an audio-frequency rate. The rotation of the motor 90 may, in some cases, be controlled by a wire or radio link to an oscillator 94 at the first station, or to a common or synchronized alternating voltage supply.

Reflected waves from the rotating dipole 88 are received by the dipole 82 and its associated reflector 84, and are conducted to the left through the waveguide 87, to the directional coupler 86b of the device 86. These reflected waves pass downwardly through the directional coupler 86b into the waveguide 96. Also entering the waveguide 96 is a much larger quantity of waves coming directly from the oscillator 80 through the directional coupler 86a. A variable attenuator 93 controls the amount of the wave from the oscillator 80 which reaches the waveguide 96. From the waveguide 96 they pass to a crystal detector 97.

The frequency of the oscillator 80 is varied slowly enough that the frequency of the wave transmitted by the radiator 82 is substantially the same as the frequency of the received reflected wave. It may be varied from, for example, about 8000 megacycles to 11,000 megacycles per second.

For producing this variation in frequency, there is provided a frequency control 95, adapted gradually to tune the oscillator 80, electronically and/or mechanically.

The detected wave emerging from the detector 97 is applied to a coupling condenser 100 and its A.-C. components are thence applied to a band-pass filter 98. The pass band of the filter 98 is chosen, in relation to the frequency at which the reflecting properties of the reflector 88 is varied, as has been described previously in connection with the filter 50.

The waves from the filter 98 are then applied to an A.-C. amplifier 99 and then to a phase-sensitive detector and averaging filter, which are, together, represented as the device 101. They may, in structure, be like the elements 57 and 58 of FIG. 1.

Because the frequency of the transmitting oscillator 80 is gradually varied, the wave applied to the phase-sensitive detector will successively pass through a series of nulls. These nulls represent conditions when the transmitted wave and the wave received from the rotating dipole 88 are approximately 90 degrees out of phase at the first station. The phase-sensitive detector is synchronized with the rotation of the dipole in a manner generally like that of the detector 57 of FIG. 1. It may, for example, be energized with a wave having twice the frequency with which the dipole rotates. The detector and filter 101 produce an output voltage varying at an audio-frequency rate related to the rotation frequency of the dipole 88. The sense of this voltage reverses when the phase relation between $e_2$ and $e_1$ effectively goes from lead to lag or vice versa. The result is that the output voltage from the phase-sensitive detector and filter 101 approaches a definite null periodically, as the frequency of the oscillator 80 is gradually varied.

The frequency of rotation of the dipole 88 is sufficiently more rapid than the rate of variation of the frequency of the oscillator 80 that these nulls appear considerably less frequently than the frequency of rotation of the dipole 88.

The output voltage from the phase-sensitive detector and filter 101 is applied to a counter 104, which is arranged to count the nulls in that voltage. The counter may be arranged so as to count a null only after the voltage at the input of the counter has gone through a maximum value. Thus, small fluctuations in frequency of the oscillator 80 will not cause multiple counting of the same null.

The output from the phase-sensitive detector and filter 101 may also be applied to a D.-C. voltmeter 106, of the center-scale type. This instrument may be employed to set the initial and final frequencies of the oscillator 80 at values which will produce a null in that output.

The system also includes a reference oscillator 108. To measure the frequency of the oscillator 80, the output from this oscillator is mixed, through directional couplers 86c and 110, with the output from the reference oscillator and applied to a crystal detector 112, the detected output from which is applied to a frequency meter 114. The frequency meter 114 is adapted to respond to the difference between the frequency of the oscillators 80 and 108. It thus measures this difference in frequency and may, if desired, be calibrated to read directly the frequency of the oscillator 80.

To operate the system, the variable frequency oscillator 80 is adjusted to an initial frequency to produce a null on the meter 106. This initial frequency is determined by the meter 114.

The transmitted frequency is then varied, by varying the tuning of the oscillator 80, through a very large frequency range, for example, from about 8000 megacycles to about 11,000 megacycles. The exact frequency increment is determined by reading the meter 114 at the final frequency and comparing this with the initial frequency. As a result of the frequency variation, there are produced and counted, by the counter 104, a large number of nulls. If the separation of the second station from the first station were approximately a mile, this would produce approximately 40,000 nulls. In this way, a frequency increment is determined, and a corresponding number of nulls produced by this frequency increment is determined. This data is used to determine distance, in accordance with the following formula $$x = \frac{mc}{4\sqrt{k}\Delta f}$$

where $x$ = distance
$m$ = number of nulls counted
$c$ = velocity of waves
$k$ = dielectric constant of air
$\Delta f$ = frequency increment.

Instead of having the operator rely upon observation of the voltmeter 106 in order to set the oscillator 80 initially and finally at values which will produce a null in the output from the phase-sensitive detector and filter 101, the system may be provided with an automatic wavelength control. For this purpose, there may be provided means forming a path through a lead 111 and a switch 113, from the output of the detector and filter 101 to the frequency control 95. At the beginning of the operation, the operator adjusts the frequency control 95 so that it produces approximately the desired initial frequency. The output from the detector and filter 101 will then be approximately the desired initial null. Then, in order to cause the system to produce more accurately the initial null, the operator closes the switch 113. The fed-back voltage through the lead 111 then actuates the frequency control 95 to change the frequency of the oscillator 80 slightly, up or down, to reduce the voltage in the lead 111 to a precise null, as desired.

The operator then opens the switch 113. He then actuates the frequency control 95 to change gradually the frequency of the oscillator 80 toward the final desired frequency. When it has been changed to approximately the final desired frequency, the operator then again closes the switch 113. The fed-back voltage in the lead 111 again actuates the frequency control 95 to make any slight change in the frequency of the oscillator 80 needed in order that the final value will be a precise null, as desired.

Although the system has thus far been illustrated by an arrangement embodying C.W. transmitted waves, it may alternatively employ pulsed waves. If pulsed waves are employed, the pulse repetition rate should be much higher than the rate at which the properties of the reflector are varied. Also, the pulse width should be long enough so that interference conditions exist for a maojr part of the width (duration) of a pulse. Thus a system essentially like that which has been described in connection with FIG. 1 may be employed, in which the source 30, instead of emitting C.W. waves, emits pulses of high-frequency electromagnetic oscillations. As an example, it may emit such pulses, at a repetition rate of 10,000 pulses per second, the pulses being of ten microseconds duration, and the frequency of the waves being 10,000 megacycles. In such a system, the reflecting properties of the reflector may be varied at, say 400 cycles per second. These figures are, of course, purely illustrative.

*Alternative methods and apparatus for varying the reflecting properties of the reflector*

Although a rotating dipole has been used as an illustration of a reflector, the reflecting properties of which are periodically varied, the system is applicable to the use of other types of reflectors, and other arrangements for varying their reflecting properties. For example, instead of the rotating dipole at the second station of the system, one may use any of the arrangements described below in connection with FIGS. 7–13.

In FIG. 7 there is shown a horn 116 to be located at the second station. This horn and its associated components are adapted to serve as a variable reflector. Waves entering the horn from the left pass into a waveguide 117, which is short-circuited at its right-hand end. Near the right-hand end but spaced from it a quarter wavelength, there is provided a device for varying the reflecting properties of the apparatus. This device is illustrated as a T-R tube 118 having two electrodes connected to two terminals 119. A varying electric voltage is applied to these terminals. For example, there may be applied a high-frequency square wave of, for example, 50,000 cycles per second. This applied voltage may vary from a zero value, at which the tube 118 is not fired, to, for example, a positive value great enough to fire the tube 118. The varying conditions of this tube vary the reflecting properties of the reflector, so as to give the reflected waves an approximately square wave modulation of 50,000 cycles per second in the present illustration. It may be noted that this modulation is above the audio-frequency range. The components at the first station which selectively respond to the effects produced by this modulation, should, in such an embodiment, be of such a type that they are capable of responding to this higher frequency. For example, the phase-sensitive detector should preferably be of an electronic type, rather than one employing electro-mechanical moving elements.

In FIG. 8 there is shown a horn 120 connected to a waveguide 121, and the operation is along the same general lines as the apparatus of FIG. 7 except that in FIG. 8 the reflecting properties of the apparatus are varied by an electro-mechanical plunger 122, which periodically oscillates in position transversely of the waveguide, as indicated. The plunger is located a quarter wavelength from the end of the waveguide. The modulation frequency of such apparatus should be lower than the 50,000 cycles per second value mentioned as an illustration in FIG. 7. Thus the plunger 122 in FIG. 8 would oscillate at an audio-frequency rate of, for example, 400 cycles per second.

In FIG. 9 there is shown as another variable reflector, an antenna wire 124 supported by insulators 126 and including a switch 128. This switch is opened and closed periodically to vary the reflecting properties of the antenna.

In FIG. 10 there is shown a horn 130 connected to a waveguide 132 short-circuited at its right-hand end. Within the waveguide there is provided a ferrite rod 134 bearing a winding 136. This winding is energized with alternating voltage applied to the terminals 138. As the current flowing through the winding 136 varies with time, this varies the polarization of the field to which the ferrite rod 134 is preferentially responsive. Because the wave is polarized, the result is that the reflecting properties of the apparatus are varied at a frequency determined by the frequency of the wave applied to the terminals 138.

In FIG. 11 there is shown a radiator and receiver 142 at a first station and a movable reflector 144 at the second station. The reflector 144 is adapted to be oscillated back and forth so that the reflected lobe of energy alternately misses and strikes the radiating and receiving apparatus 142. This produces the desired effective variation of the reflecting properties of the reflector 144, as viewed from the first station.

FIGS. 12a and 12b show an arrangement in which a wave is transmitted from a radiator 146 at a first station, strikes a reflector 148 at a second station and is reflected back to the radiator 146, which also serves to receive the reflected wave. The reflector 148 is oscillated longitudinally, toward and away from the first station. In FIG. 12b it has been displaced away from the first station by an incremental distance d. This distance d may advantageously, for example, equal a quarter wavelength. As the reflector 148 is thus oscillated, the phase relation of the reflected wave, with respect to the transmitted wave, will correspondingly vary, at the detector. There will consequently be produced amplitude-modulation of the composite wave emerging from the directional coupler, through the waveguide 46 of FIG. 1 or the waveguide 96 of FIG. 6.

In FIG. 13 there is shown a radiator 150 and a reflector comprising a dish 152 and a neon tube 154. The tube 154, could alternatively, be of the T-R type. A square-wave voltage, varying between zero and another value, is applied to the neon tube 154 so as to alternately light it and extinguish it. This varies the properties of the neon tube, so as to vary the effective reflecting properties of the reflector. The reflected wave received by the device 150 is correspondingly varied.

Although there has been described in some detail apparatus and methods employing electromagnetic waves, the invention is not, in its broadest aspect, limited to this type wave. The system may, instead, employ ultrasonic waves. If this is to be done, the devices 30, 32, 38, 45, 46, 47 and 48 of FIG. 1 are replaced, respectively, with a sonar-type transducer and receiver. The reflector at the second or reflecting station is varied periodically, in any of a variety of ways, so as to vary its reflecting properties for ultrasonic waves. For this purpose, the reflector itself may be periodically oscillated, as has been shown and described in connection with FIG. 11; or a small reflector may be continuously rotated about an axis perpendicular to axis of wave propagation; or an element for attenuating ultrasonic waves may, in the manner generally illustrated in FIG. 8, be periodically oscillated in position transversely of a waveguide connected to a horn at the reflecting station; or the reflector may be oscillated longitudinally as illustrated in FIG. 12b; or the effective reflecting properties of the reflector for ultrasonic waves may be otherwise varied. With these modifications, the system of FIG. 1 heretofore described may be employed with ultrasonic waves.

While illustrative forms of the apparatus and method to be used in accordance with the invention have been described in some detail, along with certain modifications, it will be understood that various changes may be made without departing from the general principles and scope of the invention as defined by the appended claims.

We claim:

1. In combination, the steps of transmitting an unmodulated wave from a first station to a reflector at a reflecting station, sensing at said first station the wave reflected from said reflector, periodically varying the reflecting properties of said reflector at a repetition rate low compared to the frequency of said transmitted wave, to vary thereby the amplitude of said reflected wave, mixing said varying reflected wave with a larger quantity of the unmodulated transmitted wave at said first station to obtain a composite wave, and selectively detecting said composite wave to derive a quantity determined by said periodic variations in the reflecting properties of said reflector and by the phase relationship at said first station between said transmitted and reflected waves, said phase relationship being dependent upon the distance between said first station and said reflecting station, said derived quantity being substantially independent of the effects of wave reflections from objects other than said reflector.

2. A method according to claim 1, including sensing changes in said distance by sensing changes in said derived quantity.

3. A method according to claim 1 in which the step of periodically varying the reflecting properties of said reflector includes rotating a dipole at said reflector.

4. A method according to claim 1 in which the step of periodically varying the reflecting properties of said reflector includes applying a periodically varying magnetic field to a portion of said reflector.

5. A method according to claim 1 in which the step of periodically varying the reflecting properties of said reflector includes applying a periodically varying electrical voltage to a portion of said reflector.

6. A method according to claim 1 in which the step of periodically varying the reflecting properties of said reflector includes periodically mechanically moving at least a portion of said reflector.

7. A method according to claim 1 in which the step of periodically varying the reflecting properties of said reflector includes periodically varying an impedance element connected to said reflector.

8. A method for detecting differences in the distance between a first station and an object at a second station comprising transmitting a wave of higher than audio-frequency from said first station to a reflector at said second station, sensing at said first station the wave reflected from said reflector, varying said reflector at a frequency low compared to the frequency of the transmitted wave, so as thereby to vary the amplitude of the reflected wave, whereby said reflected wave has a modulation envelope different in shape from the transmitted wave, mixing said varying reflected wave with a larger quantity of the transmitted wave at said first station to obtain a composite wave, detecting said composite wave to eliminate components of said transmitted frequency and to derive a quantity representing the amplitude of the low-frequency variations in said composite wave caused by said variations in the reflecting properties of said reflector, adjusting the electrical length of the path between said first station and said reflector so that said derived quantity has its minimum value, fixing the spacing between said reflector and said object, and sensing variations in the distance of said object from said first station by detecting variations in said derived quantity from its minimum value.

9. In a distance-sensing method, in combination, the steps of transmitting unmodulated waves of higher than audio-frequency from a first station to a reflecting object at a second station, systematically varying the reflecting properties of said object at an audio-frequency rate, receiving at said first station waves reflected by said varying object, mixing said received waves with a larger quantity of said unmodulated transmitted waves of higher than audio-frequency to produce composite waves, selectively detecting said composite waves to derive a quantity related to the audio-frequency variations in their amplitude caused by said audio-frequency variations in the reflecting properties of said object, and rejecting waves produced by reflections from objects whose reflected properties do not vary at said audio-frequency rate, said derived quantity having a minimum value when said waves reflected from said reflector have a 90-degree phase relation with said unmodulated transmitted waves, and sensing the appearance of said minimum value.

10. A method as in claim 9 including the steps of gradually varying said transmitting frequency so as to cause said transmitted waves and the waves reflected from said varying object to pass through a plurality of conditions in which they differ in phase at said first station by 90 degrees, to produce a plurality of said minima, the rate of said variation of frequency being slow enough that the transmitted and received frequencies are substantially equal, counting said minima, and measuring the frequency increment required to produce a predetermined number of said minima.

11. A method for sensing changes in the shape of an object, comprising directing unmodulated electromagnetic waves from a first station to a plurality of stations located on said object, selectively varying, one at a time, the reflecting properties of reflecting means located at said stations, to vary thereby the amplitude of the waves reflected from said selected station, receiving said reflected waves at said first station, mixing said reflected waves with a larger quantity of the unmodulated transmitted waves at said first station to obtain a composite wave, detecting and filtering said composite wave to derive a voltage varying at the frequency at which the reflecting properties of said reflecting means are varied, adjusting the spacing of said reflecting means at said stations with respect to said object to produce a null in said voltage, and sensing variations of said voltage from its said null condition when said reflecting means are respectively periodically varied.

12. Distance-measuring apparatus, comprising means for causing carrier-frequency waves to be propagated from an object at one station to a sensing station, means at said first-mentioned station for impressing on said waves a modulation uniquely characteristic of that station, so that said waves may be distinguished from other waves from other stations, a source of reference waves at said sensing station having the same carrier frequency as said first-mentioned waves, means at said sensing station for combining a quantity of said first-mentioned waves received from said object with a much larger quantity of said reference waves, to produce composite waves, a detector and frequency-selective means for deriving from said composite waves a modulation frequency component uniquely characteristic of said waves from said first-mentioned station, the amplitude of said component approaching a null when said first-mentioned waves have a 90-degree phase relation to said reference waves at said detector, an output device, and means responsive to said component for actuating said device to cause it to respond to variations in said amplitude from said null, said variations representing changes in the distance from said sensing station to said object.

13. Distance-measuring apparatus comprising means including a source of alternating waves of higher than audio-frequency at a first station for directing said waves toward a second station, a reflector at the second station for reflecting said waves back toward said first station, means for periodically varying the reflecting properties of said reflector at a predetermined frequency to modulate the reflected waves, said last-mentioned means being adapted to cause said reflected waves to have a modulation envelope different in shape from the transmitted waves, means at said first station for combining said reflected waves with a larger quantity of said higher than audio-frequency transmitted waves, means for deriving from said combined waves a quantity representative of the said modulation of said reflected waves and of the phase relation between said transmitted and reflected waves at said first station, said derived quantity being substantially independent of the effects of wave reflections from objects other than said reflector, an indicator, and means responsive to said derived quantity for actuating said indicator to cause it to produce a definite response to variations in said derived quantity.

14. Apparatus according to claim 13, comprising feedback means responsive to said derived quantity for adjusting the frequency of said source to maintain a null in said derived quantity, and means actuated by said feedback means for indicating changes in the distance from said first station to said reflector at said second station.

15. In apparatus for indicating a quantity related to the distance from a first station to an object the reflecting properties of which are varying at a known frequency, in combination, means for transmitting unmodulated high-frequency waves from said first station to said object, means at said first station for receiving said waves after reflection from said object, along with spurious waves reflected from other objects, means for detecting said received waves, frequency-selective means for selecting, from said detected waves, waves varying at a frequency $n$ times the frequency at which the reflecting properties of said object are varied, where $n$ is an integer, said selected waves being substantially independent of the effects of said spurious waves, an indicator device, and means actuated by said waves from said frequency-selective means for causing said indicator device to respond to the appearance of a minimum in the amplitude of said selected waves.

16. Apparatus according to claim 15 in which said indicator device is a cathode ray oscilloscope, said apparatus comprising means for applying said selected waves to said oscilloscope to produce a deflection of its beam along one axis, and means for producing a deflection of said beam along another axis at a repetition rate to produce a standing wave pattern, whereby changes in said pattern indicate changes in said distance.

17. Apparatus as in claim 15 in which said indicator device comprises a counter responsive to successive nulls produced in said selected waves when said transmitted wave and the wave reflected from said object differ in phase at said first station by approximately 90 degrees.

18. Apparatus as in claim 15 in which said indicator device includes a counter responsive to successive nulls produced in said selected waves when said transmitted wave and the wave reflected from said object differ in phase at said first station by approximately 90 degrees, and means for varying the frequency of said transmitted waves between known limits to produce a plurality of said nulls at a repetition rate small compared to the known frequency at which the reflecting properties of said reflector are varied.

19. Apparatus for measuring the distance from a first station to a second station, comprising means including a variable-frequency transmitting oscillator and means for varying the frequency of said oscillator for transmitting from said first station to said second station carrier-frequency waves which vary through a frequency range, means for measuring said frequency range, a reflector at said second station, means for periodically varying the reflecting properties of said reflector at a modulation-frequency rate, whereby said reflector reflects said waves toward said first station and modulates said reflected waves, means at said first station for receiving said reflected waves, means for combining said received reflected waves with a larger quantity of said transmitted waves to produce composite waves, means for detecting said composite waves, said detecting means being selectively responsive to modulation-frequency components of said composite waves produced by said variations in the reflecting properties of said reflector, whereby to derive a quantity the amplitude of which passes through successive minima when said transmitted frequency passes through values producing at said detecting means a 90-degree phase relation between said transmitted wave and said wave reflected by said varying reflector, and means for counting the number of said minima produced by said variation of said transmitted frequency through said measured range, whereby said distance may be determined from the number of said minima and the magnitude of said frequency range.

20. Apparatus for indicating a quantity related to the distance from a first station to a reflecting station, comprising, in combination, means for transmitting a wave from said first station to said reflecting station, a reflector at said reflecting station for causing said wave to be reflected therefrom, means for periodically varying the reflecting properties of said reflector at a repetition rate low compared to the frequency of said transmitted wave, to vary thereby the amplitude of the reflected wave, said last-mentioned means being adapted to cause said reflected wave to have a modulation envelope different in shape from said transmitted wave, sensing means at said first station for receiving said varying reflected wave, means for mixing said varying reflected wave with a larger quantity of the transmitted wave at said first station to obtain a composite wave, and means for selectively detecting said composite wave to derive a quantity determined by said periodic variations in the reflecting properties of said reflector and by the phase relationship at said first station between said transmitted and reflected waves, said phase relationship being dependent upon the distance between said first station and said reflecting station, said derived quantity being substantially independent of the effects of wave reflections from objects other than said reflector.

21. Apparatus for indicating a quantity related to the distance from a first station to a reflecting station, comprising, in combination, means for transmitting an unmodulated wave of higher than audio frequency from said first station to said reflecting station, a reflector at said reflecting station for causing said wave to be reflected therefrom, means for systematically varying the reflecting properties of said reflector at an audio frequency rate, to vary thereby the amplitude of the reflected wave, sensing means at said first station for receiving said varying reflected wave, means for mixing said varying reflected wave with a larger quantity of the unmodulated transmitted wave at said first station to obtain a composite wave, and means for selectively detecting said composite wave to derive a quantity determined by said audio-frequency variations in the reflecting properties of said reflector and by the phase relationship at said first station between said transmitted and reflected waves, said phase relationship being dependent upon the distance between said first station and said reflecting station, the amplitude of said derived quantity having a minimum value when said phase relationship is equal to 90° and being substantially independent of the effects of wave reflections from objects other than said reflector, variation in the amplitude of said derived quantity from said minimum value representing changes in said distance.

22. Apparatus for indicating a quantity related to the distance from a first station to a second station, comprising, in combination, means for transmitting unmodulated waves of higher than audio-frequency from said first station to said second station, a reflector at said second station for causing said waves to be reflected therefrom, means for systematically varying the reflecting properties of said reflector at an audio-frequency rate $f$ to vary thereby the amplitude of the reflected wave, sensing means at said first station for receiving waves reflected by said varying reflector, means for mixing said received waves with a larger quantity of said unmodulated transmitted waves to produce composite waves, means for selectively detecting said composite waves to derive a quantity related to the audio-frequency variations in the amplitude thereof caused by said audio-frequency variations in the reflecting properties of said reflector, the amplitude of said derived quantity having a minimum value when said waves reflected from said reflector have a 90° phase relation with said transmitted waves, filter means responsive to said detecting means for rejecting waves produced by reflections from objects whose reflected properties do not vary at said frequency $f$, and an indicating device responsive to said filter means for sensing the appearance of said minimum value, variations in the amplitude of said derived quantity from said minimum value representing changes in the distance from said first station to said second station.

23. Apparatus as in claim 22 in which said indicating device includes a counter responsive to successive minima produced in said composite waves when said transmitted waves and said waves reflected from said reflector differ in phase at said first station by 90°, and means for gradually varying the frequency of said transmitted waves between known limits to produce a plurality of said minima, the rate of said variation of frequency being slow enough so that the transmitted and received frequencies are substantially equal.

24. Apparatus as in claim 22 in which said filter means comprises a band pass filter selectively responsive to waves having said frequency $f$.

References Cited in the file of this patent
UNITED STATES PATENTS

| | | |
|---|---|---|
| 2,151,323 | Hollmann | Mar. 21, 1939 |
| 2,212,110 | Beuermann | Aug. 20, 1940 |
| 2,591,731 | Shapiro | Apr. 8, 1952 |
| 2,632,160 | Rothacker | Mar. 17, 1953 |
| 2,779,018 | Gregoire | Jan. 22, 1957 |

UNITED STATES PATENT OFFICE
CERTIFICATE OF CORRECTION

Patent No. 3,019,430 January 30, 1962

Norman E. Pedersen et al.

It is hereby certified that error appears in the above numbered patent requiring correction and that the said Letters Patent should read as corrected below.

Column 2, line 50, for "from" read -- From --; line 59, for "compositive" read -- composite --; column 3, line 45, for "an" read -- in --; column 4, line 35, for "I none" read -- In one --; line 38, for "a" read -- as --; column 7, line 24, after "say" insert a comma; line 60, for "oscillocope" read -- oscilloscope --; line 73, for "sihft" read -- shift --; column 11, line 15, for "nuuls" read -- nulls --; column 12, line 31, for "maojr" read -- major --; column 14, line 6, after "to" insert -- the --.

Signed and sealed this 14th day of August 1962.

(SEAL)
Attest:

ERNEST W. SWIDER
Attesting Officer

DAVID L. LADD
Commissioner of Patents